United States Patent Office 2,851,472
Patented Sept. 9, 1958

2,851,472
POLYSILOXANE COMPOUND

Donald L. Bailey, Snyder, and Ronald M. Pike, Grand Island, N. Y., assignors to Union Carbide Corporation, a corporation of New York No Drawing. Application October 31, 1955
Serial No. 544,033

2 Claims. (Cl. 260—448.2)

This invention relates to a novel polymerizable polysiloxane compound containing silicon-bonded hydrocarbon constituents, including methyl and vinyl radicals in the form of a relatively short-chain, well defined, low molecular weight linear polysiloxane. More particularly, the invention contemplates the provision of a polymerizable linear trisiloxane containing a vinyl substituent in the form 1,1,1,5,5,5-hexamethyl-3-trimethylsiloxy-3-vinyl-trisiloxane [tris(trimethylsiloxy) vinylsilane], the linear trimer represented by the formula:

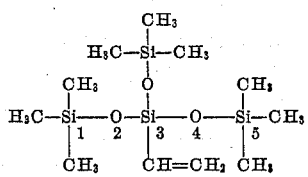

and which may be represented, also, by the formulae:

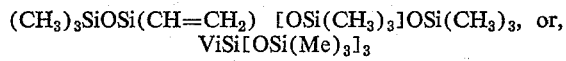

$(CH_3)_3SiOSi(CH=CH_2) [OSi(CH_3)_3]OSi(CH_3)_3$, or, $ViSi[OSi(Me)_3]_3$ wherein Me and Vi represent the methyl and vinyl radicals, respectively.

The various hydrocarbon substituted ploysiloxanes heretofore known in industry are essentially of two general types, (1) those containing all saturated hydrocarbon substitutents, and in which crosslinking required for the formation of higher molecular weight resinous materials is effected through the $(Si-O-Si)_n$ linkages, and (2) those containing siloxane units with saturated hydrocarbon substituents as well as siloxane units with unsaturated hydrocarbon substituents, or siloxane units having mixed saturated hydrocarbon substituents and terminally unsaturated substituents, such as the vinyl radical, through which they may be polymerized in the formation of higher molecular weight compounds. For the most part, known polysiloxanes of the second classification above are either cyclic in nature, or poorly defined, high molecular weight polymers in which the positioning of unsaturated groups is unknown or at best uncertain. Furthermore, the known linear polysiloxanes of the same general classification are either (1) relatively high molecular weight compounds containing the repeating Si-O-Si group substituted with relatively small percentages of unsaturated substituents, considering the overall chain-lengths of the polymeric molecules, or, (2) relatively high molecular weight compounds containing the repeating Si-O-Si group substituted with relatively high percentages of unsaturated substituents. The latter class of compounds are multifunctional with respect to unsaturated groups such that when polymerized through these groups, extensive crosslinking occurs. The compound of the present invention, on the other hand, is a well defined, pure compound of known structure, and is monofunctional with respect to the unsaturated or vinyl substituent group. Accordingly, the compound may be employed as a monomeric constituent and its polymers, prepared through vinyl addition, are soluble, linear compounds rather than insoluble, crosslinked copolymers of the type obtained through polymerization reactions conducted with known compounds of the general class described.

Apart from the capacity of vinyl-substituted polysiloxanes to undergo organic polymerization, these compounds are of particular interest because of the fact that the reactivity of a silicon bonded vinyl group permits the application of specialized curing techniques, other than conventional siloxane condensation procedures, to polymers containing unsaturated groups of this type, such, for example, as in the preparation of silicone rubbers. While silicon bonded vinyl groups can be incorporated into high molecular weight siloxanes by conventional cohydrolysis procedures, for certain applications these techniques are not entirely satisfactory. Thus, the incorporation and uniform distribution of very small amounts of silicon-bonded vinyl groups within a polymer would be difficult to control in a cohydrolysis. Furthermore, in lieu of crude cohydrolyzates, a particular process or reaction may require an individual well defined, low molecular weight pure siloxane as a starting material either for reasons of economy or because of the desired mechanism of reaction sought, and the novel trisiloxane of the present invention is ideally suited for this purpose. For example, our compound is useful as a vinyl-containing siloxane which can be equilibrated with dimethyl siloxanes to yield vinyl-modified silicone polymers for silicone elastomers, or, for vinyl-modification of silicone polymers in general. Alternatively, the compound may be used in the preparation of copolymers with organic olefinic materials in general. Following copolymerization with organic olefines, the compound of the invention can be equilibrated with additional silicone in a controlled manner to yield, for example, "block copolymers." Such a procedure would be impossible with similar products presently known to industry.

Preparation of the novel hydrocarbon-substituted trisiloxane of the invention may be effected by cohydrolysis of vinyltrichlorosilane ($ViSiCl_3$), and trimethylchlorosilane ($Me_3SiCl$), in an aqueous organic solvent system, followed by distillation and recovery of the pure compound, or, by reaction of tris (trimethylsiloxy) silane, $HSi[OSi(Me)_3]_3$, with acetylene. Alternatively, the compound may be obtained by equilibration of hexamethyldisiloxane, $[Si(Me)_3]_2O$, with triethoxyvinylsilane, $ViSi(OEt)_3$.

The invention may be best understood by reference to the following specific example of a typical preparation and recovery of the compound of our invention:

EXAMPLE

*Preparation of 1,1,1,5,5,5-hexamethyl-3-trimethylsiloxy-3-vinyltrisiloxane*

Into a four (4) liter round bottom flask equipped with a reflux condenser, mechanical stirrer and dropping funnel were placed 200 milliliters of isopropyl ether and 400 milliliters of water. The mixture was stirred and a solution of 151.5 grams (1 mole) of vinyltrichlorosilane, 633 grams (6 moles) of trimethylchlorosilane, and additional isopropyl ether equivalent to 300 moles, was added via the dropping funnel over a two (2) hour period. The rate was sufficient to maintain the reaction mixture at reflux. Thereafter, the mixture was stirred for one (1) hour. The ether layer was separated, washed three times with separate 250 ml. portions of water followed by two washings with separate 250 ml. portions of a saturated sodium bicarbonate solution. The ether was then removed by distillation and the residue fractionated through a 45-plate Podbielniak column. The following fractions were recovered in the yields indicated:

(1) Hexamethyldisiloxane—126 grams.
   (Boiling point 97–102° C./9.5 mm.)
   [Refractive index ($n_D$ at 25° C.)=1.3748–1.3749.]
(2) Hexamethyldisiloxane plus vinylsiloxane—34 grams.
   (Boiling point 64–74° C./9.5 mm.)
   [Refractive index ($n_D$ at 25° C.)=1.3886–1.3890.]
(3) 1,1,1,5,5,5 - hexamethyl - 3 - trimethylsiloxy - 3 - vinyltrisiloxane—156.5 grams (48.6%).
(4) High boiling point residue—123 grams.
   [Refractive index ($n_D$ at 25° C.)=1.4060.]

Fraction (3) above, the compound of the invention, was confirmed by infrared analysis and showed the following physical properties and analytical data:

*1,1,1,5,5,5-hexamethyl-3-trimethylsiloxy-3-vinyl-trisiloxane*

| | |
|---|---|
| Boiling point (°C.) | 78/9.5 mm. |
| Density ($d_4^{25}$) (gr./cc.) | 0.8922 |
| Refractive index ($n_D$ at 25° C.) | 1.3933 |
| Bromine absorption (gr. Br/gr. product): | |
| (Found) | 0.45 |
| (Theor.) | 0.497 |

Analysis:
   Theoretical for $C_{11}H_{30}O_3Si_4$—
      Carbon=41.0%
      Hydrogen= 9.33%
      Silicon=34.95%
      Oxygen=14.72% (by diff.)

Found:
   Carbon=40.5%
   Hydrogen= 9.7%
   Silicon=34.3%
   Oxygen=14.5% (by diff.)

The compound was successfully copolymerized with acrylonitrile, styrene, vinylacetate, vinylchloride, sulfur dioxide and N-vinyl pyrolidone.

Since it is considered obvious that some changes and modifications can be made in the foregoing methods and procedures without departing from the nature and spirit of our invention, it is to be understood that the invention is not to be limited to the specific details offered by way of illustration above, except as set forth in the following claims.

We claim:

1. A chemical compound in the form of a linear siloxane polymer consisting of one trimethylsiloxy vinyl siloxane unit and two trimethyl siloxane units.

2. The chemical compound, 1,1,1,5,5,5-hexamethyl-3-trimethylsiloxy-3-vinyltrisiloxane, represented by the formula:

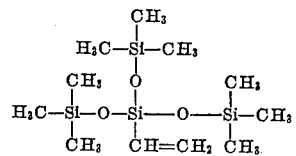

References Cited in the file of this patent

UNITED STATES PATENTS

| | | |
|---|---|---|
| 2,480,822 | Hyde | Sept. 6, 1949 |
| 2,645,628 | Hurd | July 14, 1953 |
| 2,756,246 | Burkhard | July 24, 1956 |